Dec. 19, 1944.   J. B. McGAY   2,365,573
MEANS FOR MEASURING PRESSURE DIFFERENTIALS
Filed Aug. 9, 1941   5 Sheets-Sheet 1

INVENTOR
John B. McGay
BY
ATTORNEY.

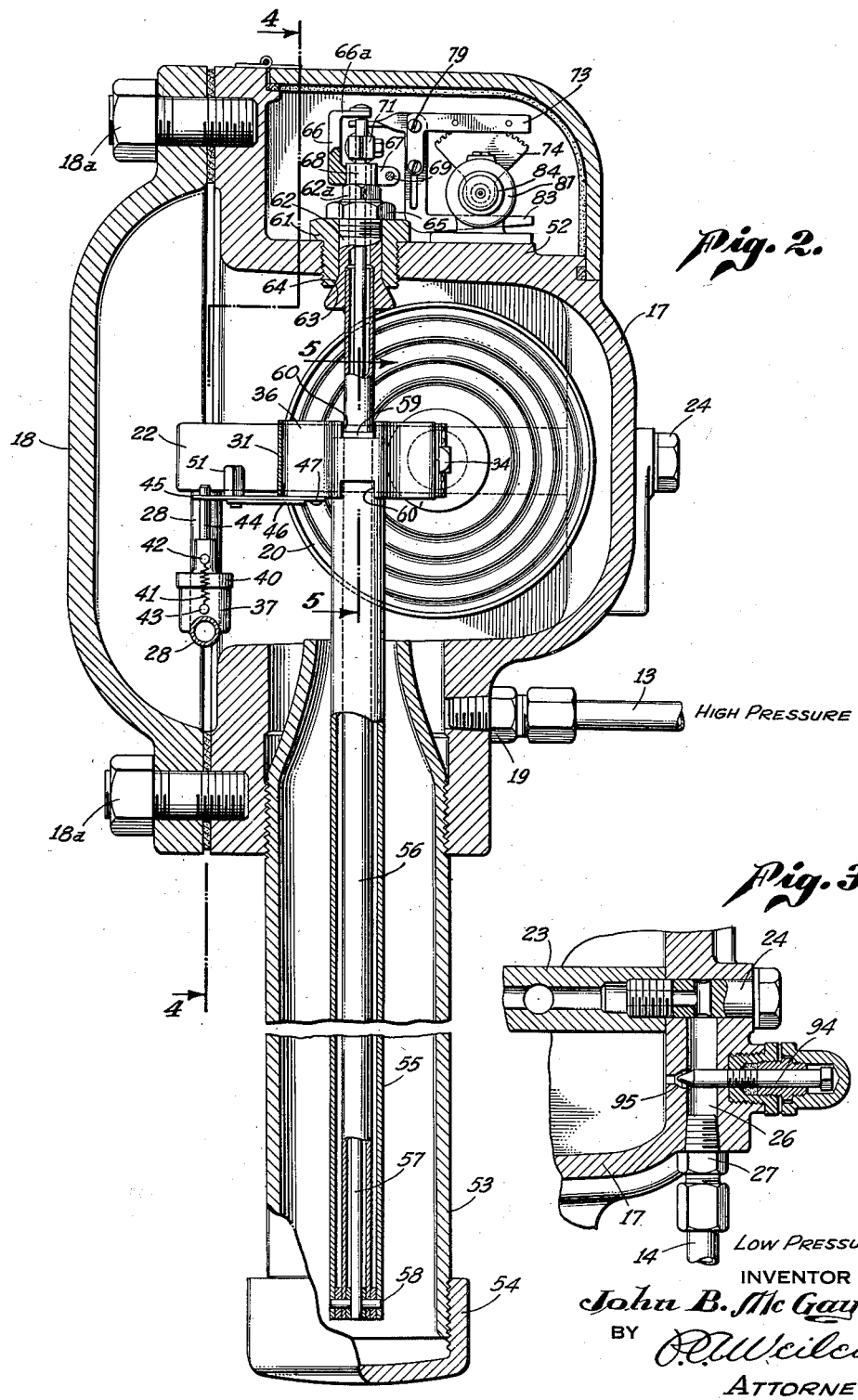

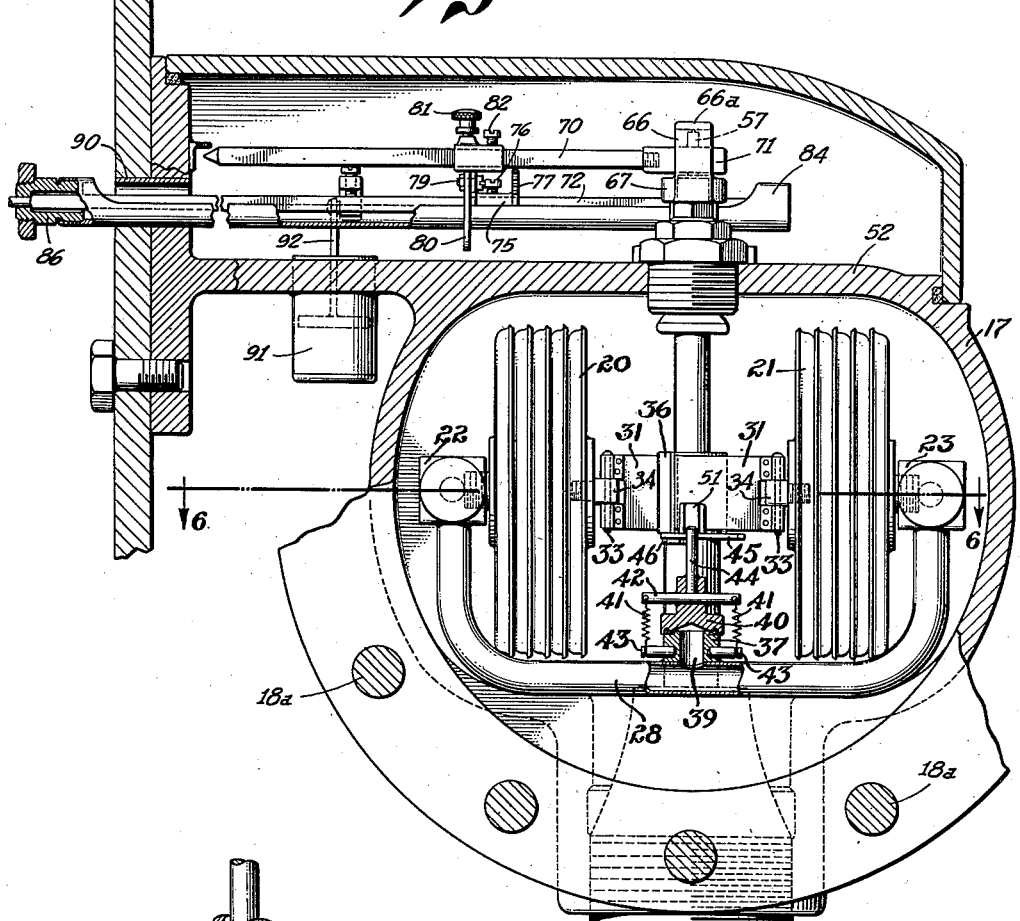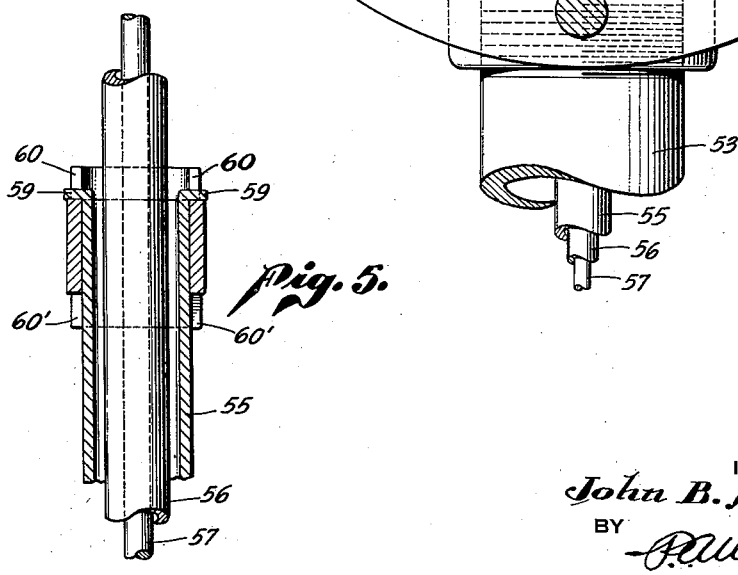

Dec. 19, 1944.  J. B. McGAY  2,365,573
MEANS FOR MEASURING PRESSURE DIFFERENTIALS
Filed Aug. 9, 1941  5 Sheets-Sheet 4

INVENTOR
John B. Mc. Gay
BY
*(signature)*
ATTORNEY.

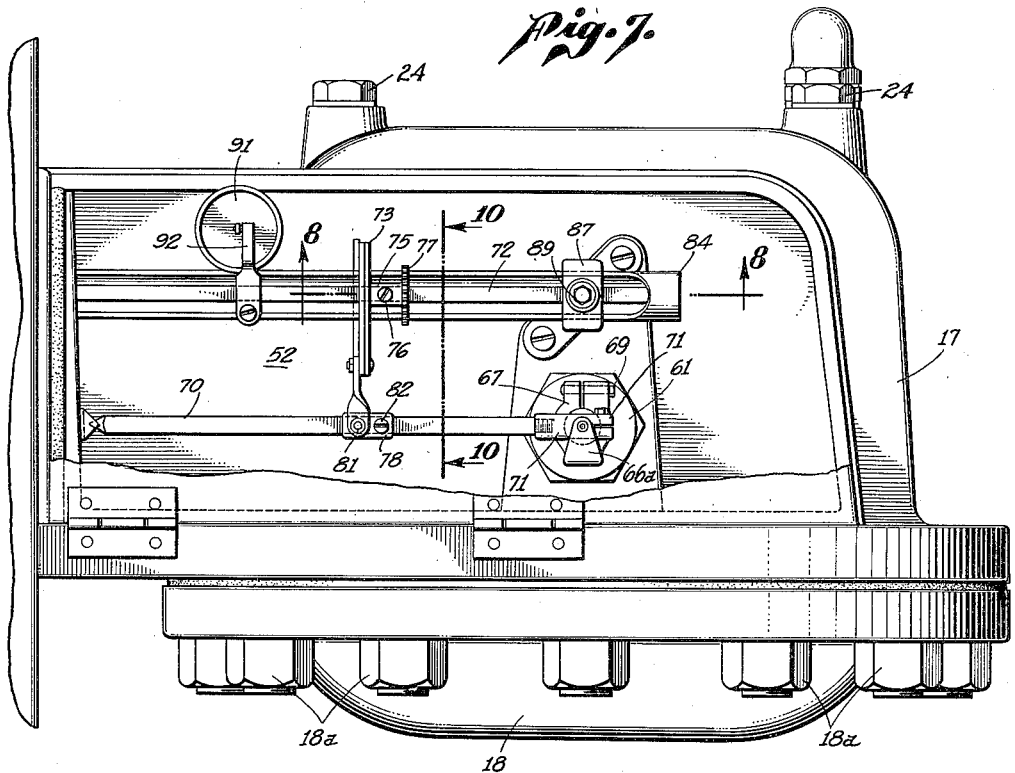
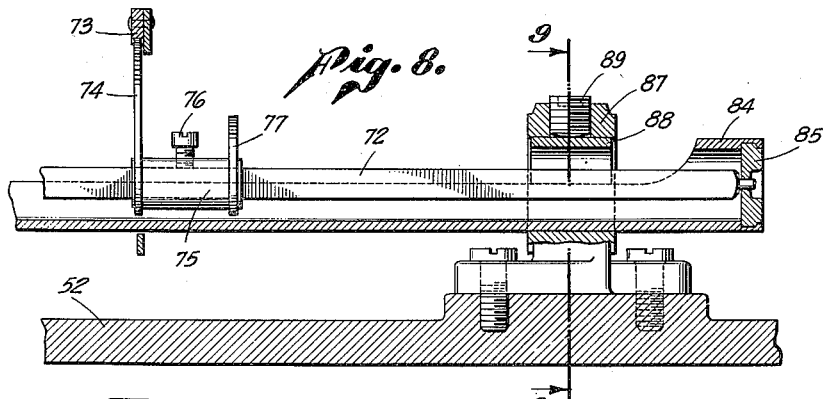
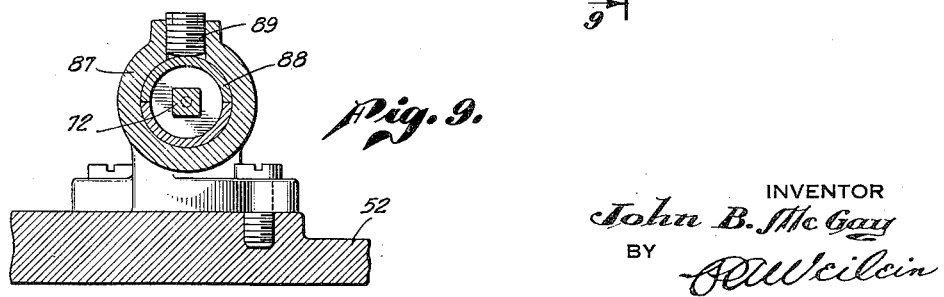

Patented Dec. 19, 1944

2,365,573

UNITED STATES PATENT OFFICE 2,365,573

MEANS FOR MEASURING PRESSURE DIFFERENTIALS

John B. McGay, Tulsa, Okla.

Application August 9, 1941, Serial No. 406,085

23 Claims. (Cl. 73—407)

This invention relates to the measurement of pressures, and more particularly to the measurement of pressure differentials such as are encountered in the measurement of flow of liquids and gases through conduits.

In the evaluation of pressure differentials, it is most desirable to provide an instrument which is responsive to the actual differentials obtaining, rather than to measure the actual pressures and either calculate the difference or employ a device which does this mechanically. This is because the differential pressure may be quite small, with large absolute pressures obtaining in the fluid flowing past the measuring device. It is difficult to devise a measuring element which will withstand the high pressures, and at the same time be accurate enough and sufficiently responsive to small changes in the high pressures, to enable an accurate evaluation of the differential actually obtaining.

There are several ways of measuring pressure differentials, the simplest of which, perhaps, by the use of a manometer. In order to keep the unit of reasonable size, it has been customary to use mercury, or other heavy liquids, and various expedients such as floats and linkages operating pens on driven charts, are employed to translate the differences in level into records. These instruments, as they depend on liquid level differences induced by pressures, must be accurately leveled. They also suffer from the disadvantage that the mercury is lost by being displaced from the instrument by sudden surges of pressure, or by accidental incorrect operation in starting the device. The check valves sometimes employed do not always function correctly, in which event the mercury will be lost. When the mercury is lost, the accuracy of the entire device is affected, and it must be taken out of service and the mercury level readjusted, or other changes made. In addition, mercury is affected by temperature, and the estimation of pressures by the height of mercury columns introduces an error due to the expansion of the mercury with increase in temperature. An instrument involving mercury is therefore accurate only when the mercury is maintained at the temperature at which the device is calibrated. Mercury is also unsuitable for measuring the flow of fluids which may be contaminated with oil, if the mercury is in direct contact with the fluid being measured, as the mercury soon becomes dirty and must be frequently cleaned or replaced.

Recourse has been had to instruments involving some sort of a flexible wall, with one pressure acting on one side of the wall, and the other acting on the other, so that the differential pressure causes a resultant force on the wall. The motion of the wall, or diaphragm, is transmitted through linkages to a suitable indicating or recording instrument. Such linkages involve, of necessity, a stuffing box to permit motion through a wall to the atmosphere, or other expedients which all introduce frictional resistance tending to decrease the sensitivity and accuracy of the system. A small leak through the stuffing box of a high pressure meter frequently results in the freezing of the shaft within the gland. This is caused by the temperature drop occasioned by the leakage of the gas through the opening occasioning ice formation on the gland. Corrosive fluids also cause difficulty, because of the deposit of products of corrosion in and around the stuffing box which tend to increase the frictional resistance of the stuffing box or cause the mechanism to stick fast completely.

As a means for overcoming the inevitable friction which results from the use of stuffing boxes, it has been suggested by Binckley, in U. S. Patent 1,827,560, that a resilient tube be secured to the fluid tight wall, and a part of the tube remote from the wall be subjected to a force to cause its deformation, the measurement of the force then being obtained by utilizing the resultant motion of the end of the tube to operate a suitable indicator or recording device. In a later patent, No. 1,966,537, he shows a device employing a tube and an arm which, when acted upon by an appropriate force, is intended to produce torsion in the tube, which torsion may be a measure of the force applied. In devices such as that of Binckley, however, the tube employed is rather short, and consequently, the total angular twist is relatively small. Consequently, in changing from one range of pressure differences to another, the torque tube must be removed and another of different torque resistance employed.

Another essential element required when recourse is had to bellows instruments for measuring small differentials between high pressures is some means to prevent the diaphragm from rupturing when subjected to high pressure on one side without a balancing pressure on the other side. Frangible discs have been used to prevent rupture of the bellows, but such discs naturally cause the device to cease functioning when they fracture, with the result that attention is required every time the line is disturbed in such a manner as to possibly cause fracture of the discs. If the fracture escapes attention, the device will give no record of the flow until it is called to the attention of the operator. It is not always possible to ascertain whether the lack of indication of flow is due to a fractured disc or to an actual lack of flow, without actual inspection of the instrument or meter conduit.

With the above deficiencies of prior art devices in mind, it is an object of this invention to provide a device which will enable the development of a pure torque in a tube for the purpose of measuring forces.

It is a further object of the present invention to produce a device which in the measurement of differential pressures will give a straight line response over a long range of pressure differences so that any portion of the response may be used to actuate an indicating or recording instrument.

It is a further object of the present invention to provide a pressure measuring device which is unaffected by temperature changes.

It is a further object of the present invention to provide a device involving a torque tube in which the torque producing means and the indicating means are at the same end of the tube.

It is a further object of the present invention to provide a device for measuring pressure differentials which does not involve the use of mercury or other liquids.

It is a further object of the present invention to provide a device for measuring differential pressures which may be operated without the necessity of precise leveling during installation and operation.

It is a further object of the present invention to produce a device for measuring pressure differentials which will operate in a large number of positions.

It is a further object of the present invention to provide, in a pressure measuring device of the type involving a bellows, a valve for the preservation of the bellows from rupture, which can be adjusted to function upon movement of the bellows in either direction beyond an adjustable range.

It is a further object of the present invention to provide, in a pressure measuring device involving a bellows, a valve for the preservation of the bellows from rupture which can be adjusted to operate at any pressure.

It is a further object of the present invention to provide, in a measuring instrument, a means for translating a force into a torque without the introduction of friction.

It is a further object of the present invention to provide a device for measuring pressures, in which only a minimum of inertia is present, thereby measuring accurately all surges in the fluid being measured.

It is a further object of the present invention to provide a pressure measuring device in which the range of pressures measured may be readily altered.

It is a further object of the present invention to provide a device for the measurement of pressures in which the relation between the pressure and the movement of the recording or indicating mechanism can be adjusted.

It is a further object of the present invention to provide a device for the measurement of pressure differentials which has, as part of its construction, by-pass means for use during the initial installation and subsequent operation of the device.

It is a further object of the present invention to provide a measuring instrument which can be adapted for use with a large number of different commercial recording instruments.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawings:

Figure 2 is an enlarged vertical section, taken on line 2—2 of Figure 1;

Figure 3 is a similar, enlarged, fragmentary section taken on line 3—3 of Figure 1;

Figure 4 is an elevational section, taken on line 4—4 of Figure 2;

Figure 5 is a fragmentary sectional elevation taken on line 5—5 of Figure 2;

Figure 7 is a partial plan view of the device shown in Figure 1, with part of the cover broken away;

Figure 8 is a fragmentary elevation, with parts in section, taken on line 8—8 of Figure 7;

Figure 9 is an enlarged section taken on line 9—9 of Figure 8; and,

Figure 1:
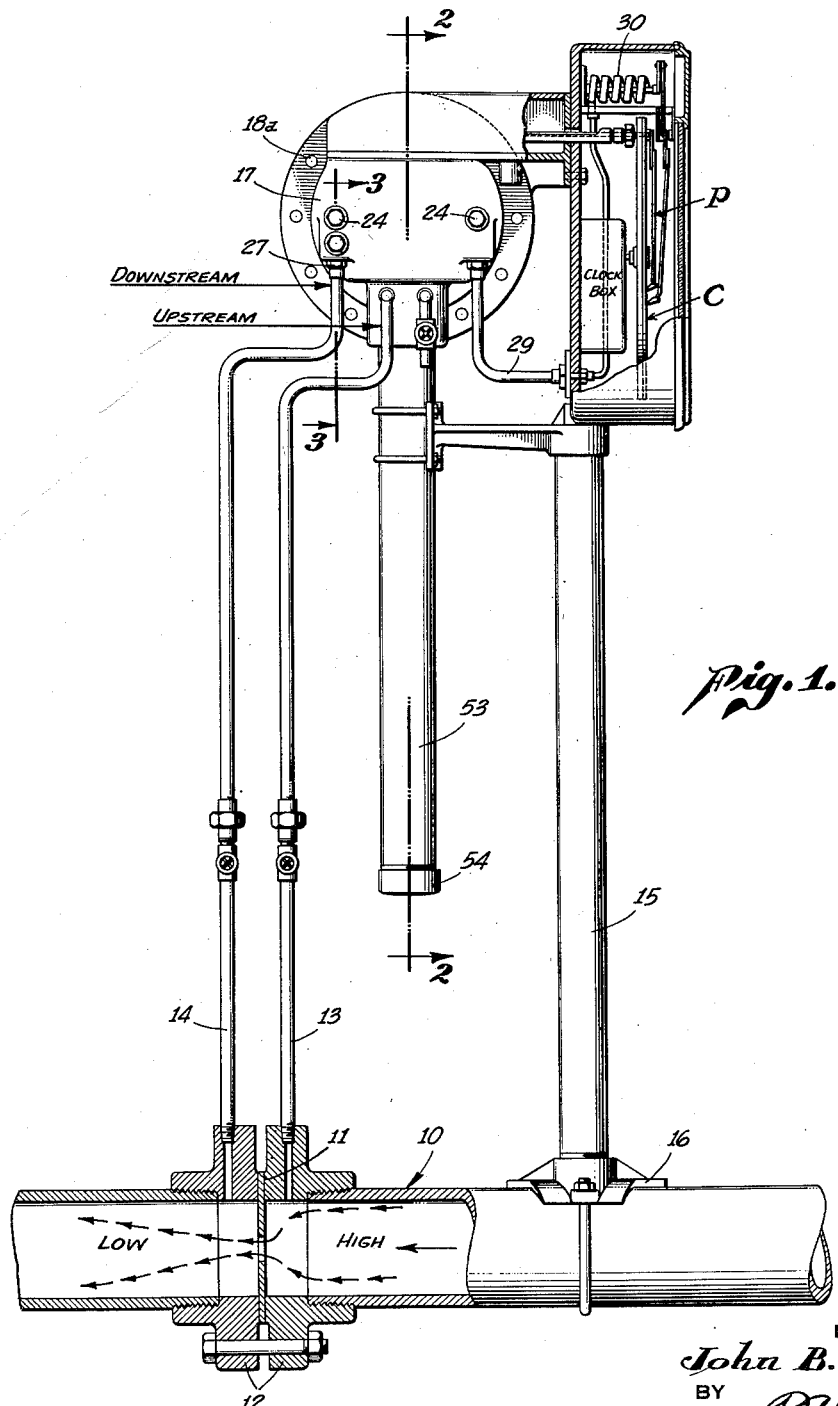
Figure 1 is an elevation, partly in section, of a device embodying the present invention, showing it connected to a conduit for measuring the flow of fluid therethrough.

Referring first to Figure 1, the device has been shown as being applied to the measurement and recording of differential pressures existing on opposite sides of a restricted orifice, for the evaluation of the rate of flow of fluid through a conduit. As shown, the conduit 10 has an orifice plate 11 of well known form in its length, between the flanges 12. Flow through the conduit in the direction of the arrows naturally results in the development of a pressure differential on the opposite sides of the plate, which, together with the absolute pressure at one side of the orifice (in the case of compressible fluids) is a function of the rate of flow. A line 13 is connected to the conduit on the upstream side of the orifice, and a similar line 14 is connected to the conduit downstream of the orifice. The mechanism involved in the present invention is for the purpose of measuring and recording on a chart the difference in pressure between that in line 13 and that in line 14. For convenience, the mechanism for accomplishing this purpose has been illustrated as being mounted on a standard 15, which is clamped to the conduit 10 by means of a saddle 16 and suitable U bolts.

It is proposed to measure the difference in pressure existing in the lines 13 and 14 by means of metallic bellows, the bellows operating in an atmosphere of a pressure such as exists in one of the lines, 13 or 14, the interior of the bellows being subjected to the pressure in the other line. For sake of illustration the present device has been shown with the high pressure line 13 supplying the circumambient pressure on the bellows, while the low pressure line supplies the internal bellows pressure.

Figure 6:
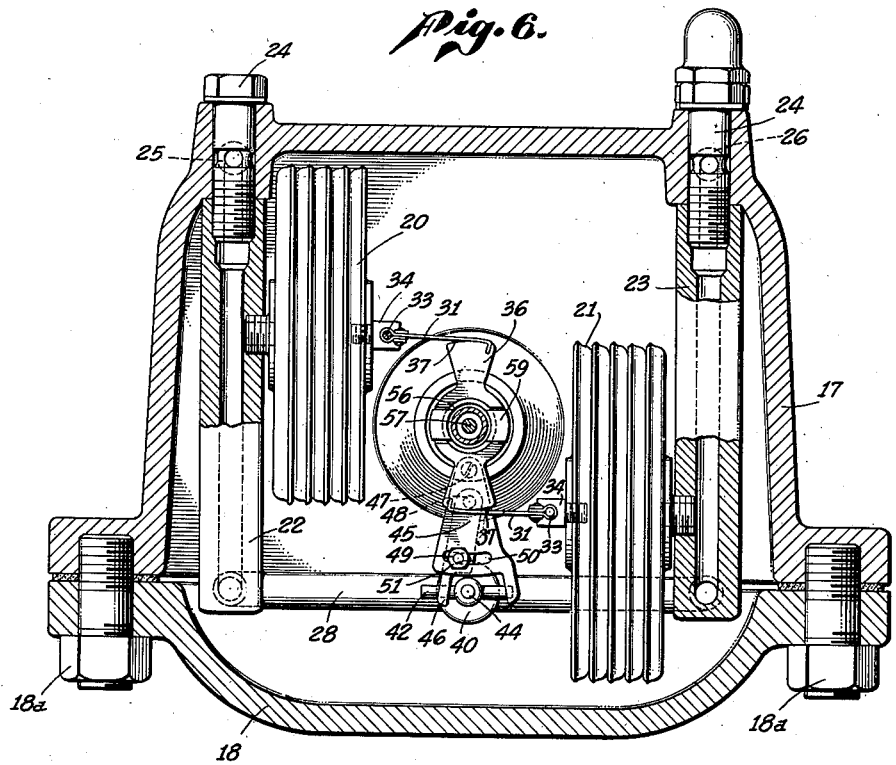
Figure 6 is a sectional plan, taken on line 6—6 of Figure 4.

For this reason, a casing 17 is provided, to which a cover plate 18 is secured by means of studs 18a or the like. The line 13 is connected to a nipple 19 passing through the wall of the casing 17 (Figure 2), so that the pressure within this chamber is that obtaining in the line 13. Within the casing 17 is a pair of bellows 20 and 21, of a well known type, formed of metal, and adapted to expand and contract in response to pressure variations. These bellows are individually mounted on supporting members 22 and 23, which are secured to the casing 17 by cap screws 24 passing through the casing and threaded into the supporting members 22 and 23. It is convenient to utilize the supporting members 22 and 23 as conduits for the transmission of pressure to the interiors of the bellows 20 and 21. For this reason, the supports 22 and 23 are hollow, as shown in Figures 3 and 6, and the cap screws 24 are provided with central and transverse bores for the passage of fluid. Passageways 25 and 26 are provided in the casing, leading to the cap screws, and the entry of fluid through these passages to the interior of the supports 22 and 23 is evident.

It is convenient to connect the low pressure line 14 to the instrument at one point only, as at passage 26, by means of a nipple 27, and utilize the other passage 25 for other purposes. For this and for other reasons hereinafter appearing, the two supports 22 and 23 are connected by a pressure equalizing tube 28, within the casing, which maintains the pressure within each of the bellows equal to that in the other. In the present instance, the other passage 25 has been utilized to provide a connection for a line 29 leading to the recorder for measuring and recording the absolute value of the pressure, as by means of the elastic spiral tube 30 within the recording instrument casing.

It can be seen that the above described construction will cause variation in the position of the free ends of the bellows, and it remains to provide some means for transmitting that motion to the exterior of the casing 17, and causing it to give intelligible readings. This has been done by first converting the force of the bellows into a torque, and the motion of the bellows into a rotary movement of a member secured to a closed tube, and measuring the amount of movement of the tube under the torque. To give the required rotary movement, the free end of each bellows is provided with a flexible tape member 31 secured thereto by a pin 33 passing through a block 34 secured to each bellows member. Any convenient means for securing the tape to the pin may be used, the shown form of connection comprising simply a doubled over portion of the tape riveted to itself to form an eye passing around the pin 33, it being understood, of course, that the tape is cut away sufficiently to clear the block 34.

A rotatable member 36 is secured to each of the tapes 31 in a manner clearly shown in Figure 6, by simply letting each tape into a slot cut in member 36, where it may be secured in any desired manner. It is evident that this member 36 will rotate counterclockwise upon compression of the bellows 20 and 21 under increased pressure differential. In order that the angular displacement of the member 36 be proportional to the rectilinear movement of the bellows, and to give the forces generated by the bellows constant lever arms, so that the moment acting upon the rotating member 36 shall be proportional to the forces generated by the bellows, the member 36 is provided with cylindrical faces 37 to which the tapes 31 are tangent between the limits of motion of the rotating member 36 and the bellows 20 and 21.

The rotary movement of member 36 actuates two main mechanisms. One mechanism limits the angular movement of member 36, so that its total movement is always within a predetermined range, and the other mechanism is used to actuate suitable indicating or recording mechanisms. Referring to Figures 4 and 6, the tube 28, communicating with the interior of each bellows 20 and 21, is provided with a valve operable by the rotary member 36 upon abnormal rotation of this member in either direction. This valve comprises a seat 37 secured to the tube 28, having a bore 39 communicating with the interior of the tube and the exterior thereof. A valve member 40 is held in place on this seat by a pair of springs 41, which are secured to pins 42 and 43, secured to the valve and the valve seat respectively. These springs are intended to merely hold the valve body in place, as, under normal operation, it is intended that the pressure surrounding the bellows shall be greater than the pressure within the bellows, and the difference in pressure will assist the springs to cause the valve to seat properly.

The valve member 40 is provided with a projecting pin 44 extending upwardly therefrom. It can be seen that any lateral displacement of this pin will result in canting of the valve with respect to the seat, thus permitting communication between the interior of the tube 28 and the interior of the casing 17, equalizing the pressures existing in these regions. To so cant the valve 40, an adjustable fork is secured to the rotary member 36. As is best seen in Figure 6, this fork is in two pieces, 45 and 46. Part 45 is secured to the member 36 by a screw 47, so that its position may be readily adjusted by simply loosening the screw. The position of this part 45 with reference to the rotary member 36 thus causes the valve to open upon movement of the bellows to any chosen degree of distention. The part 46 of the fork is pivoted to part 45 at 48, and a stud 49, secured to part 46, working in a slot 50 in the part 45, prevents relative movement between parts 45 and 46 upon tightening a nut 51 on the stud. The relative position of the parts 45 and 46 determines the total angle through which member 36 may rotate without opening the valve. The adjustment of the angular motion of member 36 which will cause the valve to open not only preserves the bellows from harm, but also permits the use of the instrument for the measurement of pressures through different ranges, in conjunction with a multiplying device described later.

The bellows, supporting members 22 and 23, and conduit 28, together with the tapes and rotary member, are removable as a unit, merely by removing screws 24. The entire bellows assembly may be inverted, so that the rotation of the member 36 can be clockwise upon increase in pressure differential, if desired.

It now remains to transmit the rotary motion of member 36 to a place exterior of chamber 17, where this rotary movement can be utilized to operate an indicating or recording device. Referring particularly to Figure 2, the mechanism for accomplishing this consists, briefly, of a stiff tube, which rotates with the member 36, a torsion tube, one end of which rotates with the stiff tube and member 36, the other end being fixed to the wall of chamber 17, thus twisting the torsion tube; and a rod within the torsion tube which follows the motion of the rotating end of the tube, which rod is used to actuate mechanisms for translating the angle of twist into intelligible readings.

The casing 17 is provided with a horizontal wall 52, directly above the rotary member 36, and an extension below member 36. This lower extension is merely a pipe 53 threaded or otherwise secured to the casing 17, and closed at its lower end by a cap 54. The horizontal wall and the extension provide the necessary mounting and space for the torsion tube assembly.

The assembly comprises a tube 55, of a suitable material and having a sufficiently high polar moment of inertia to resist any twisting effort which can be offered by the bellows and their associated rotating member 36. Its sole purpose is to transmit the angular deflection and the torque produced by member 36 to the end of a second tube 56 and a concentric rod 57. To this end, the tubes 55 and 56, and the rod 57, are secured together at their lower ends by any suitable means, as by the assemblage of spacer tubes and pin 58 shown in Figure 2. The spacer tube must completely seal the lower end of tube 56, as its upper end is open to the atmosphere.

In order to transmit the torque and angular displacement of the member 36 to the bottom end of the tube 56 and the rod 57, the stiff outer tube 55 is provided with ears 59, which rest in slots 60 cut in the member 36 to receive them. It will be noted that member 36 has additional slots 60' in its lower side, the purpose being, of course, to allow the inversion above referred to of the bellows assembly with the member 36.

The tube 56 is secured to the horizontal wall 52, and means is provided to seal it in place, so that no leakage can occur. As shown in Figure 2, a bushing 61 is threaded into the wall 52, in sealing engagement, and a second bushing 62 carries the tube 56, to which it is secured in a manner to prevent leakage. These two bushings have faces in sealing engagement, the conical surfaces 63 and 64 on the outer and inner bushings respectively. In order to bring them together, a nut 65 is threaded on the bushing 62, and it can be seen that tightening this nut will cause the surfaces 63 and 64 to be drawn together.

It is contemplated that the tube and rod assembly are to be capable of being withdrawn, which may be done by loosening nut 65, and screwing bushing 61 out of its tapped hole in wall 52. Thus a different tube assembly can be inserted, as, for instance, when it is desired to use a tube assembly in which member 56 is more or less flexible under torsion, when it is desired to make a very great change in the range of the instrument, decreasing or increasing the angular motion of the member 36 for a given pressure difference.

In addition to sealing the joint between the bushings 61 and 62, the nut 65 also serves the purpose of permitting the bushing 62 to be rotated to a certain position, and then clamped fast. To this end, the portion of bushing 62 above the nut 65 is squared as at 62a, so that the bushing can be grasped and rotated. Metal bellows are themselves elastic, and have a slightly non-rectilinear response at their neutral points, i. e., when there is no force exerted on the bellows. In order to eliminate this inaccuracy, the nut 65 may be loosened, and the bushing 62 rotated to stretch the bellows to distended position when there is a zero differential pressure. There will then be a condition, when no differential exists, in which the elastic force generated by the bellows is balanced by the elastic torque resistance of the tube. An additional force impressed on the bellows-tube system will cause the bellows and tube to take up a new position, and, as both the bellows and the tube have a rectilinear response, the movement from the position of zero differential will be directly proportional to the pressure differential tending to move the bellows.

The apparatus so far described thus produces an angular displacement of the rod 57, which is proportional to the differential pressure existing between the inside and outside of the bellows. In order to translate this angular displacement into a movement which can be utilized in a commercial recording instrument, the construction shown in Figures 2, 7, 8, 9 and 10 is utilized. A bearing member is provided for the upper end of the rod 57 to hold it against lateral displacement during rotation. This bearing consists of a U shaped element 66, which has one leg of the U in the form of a split collar 67, which grasps the circular portion 68 formed on the bushing 62 above the squared portion 62a. The split collar 67 is held in place on the portion 68 by a screw 69 passing through the halves of the collar 67. The upper leg 66a of the U shaped member 66 carries a pivot point which engages a small indentation in the end of the rod 57. This secures the rod 57 against lateral movement during angular displacement.

Figure 10:
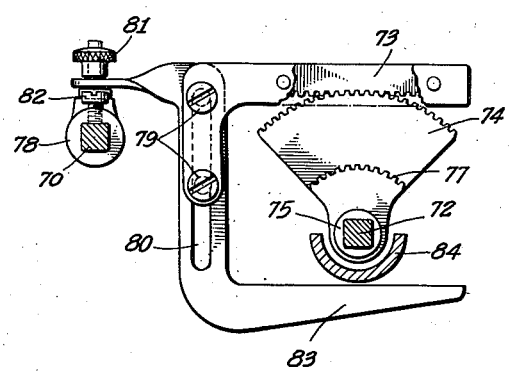
Figure 10 is a similar section taken on line 10—10 of Figure 7.

It is desirable to provide in the instrument a multiplying device which will translate the angular displacement of the end of rod 57 into a greater rotational movement of a second member, which second member is utilized to actuate the pen of the recording device. As was mentioned before, when discussing the valve 40 and the means for actuating the same, it is intended that this device be capable of adjustment so that when the device is intended to be used in measuring small differentials, the pen can be made to sweep the entire chart, and, when higher differentials are to be measured, the pen can be made to sweep the same distance; it being understood, of course, that the calibration on the chart used for low pressure measurement is more "open" than that on the high pressure chart. In order to accomplish this result, a calibration arm 70 is immovably secured to the end of rod 57 by means of a split collar 71, so that the arm 70 sweeps about an axis coincident with the axis of rod 57. A gear and rack mechanism is utilized to translate the sweep of arm 70 to rotational movement of a shaft 72, which is connected to the mechanism of the recorder. As can be seen in Figures 7 and 10 the rack member consists of a toothed strip 73, and the gear consists of a segment 74, the rack being secured to the arm 70, and the toothed segment being secured to the shaft 72. Both the rack and the gear are slidable along their respective supports, and it can be seen that if the rack and gear are slid to the right the angular rotation of shaft 72 will be a smaller multiple of the angular displacement of the rod 57 than it is in the indicated position.

It thus becomes a simple matter to change the relationship between the rotation of the shaft 72 and the angular displacement of rod 57, and thus calibrate the instrument for whatever purpose is desired. For the sake of simplicity the shaft 72 is made noncircular in cross section and the hub 75 is made to slide freely therealong, but is not rotatable with respect thereto. It may be held in adjusted position by means of a screw 76 passing through the hub 76 and engaging the shaft 72.

In order to increase the range of adjustment it is convenient to utilize more than one gear segment so that the same linear movement of a rack member can give a different angle of rotation of the shaft 72. The shown form applies two gear segments 74 and 77, although any number may be used. When such an expedient is employed it is necessary to move the rack in a vertical direction to enable it to engage gear segments of different radii. For this reason the rack member 73 is not directly connected to the collar 78, which transmits motion from the arm 70 to the rack, but is secured by means of removable fastenings 79 to a member 80 extending vertically between the shaft 72 and the arm 70. By provision of a slot in the member 80 it thus becomes a simple matter to change from one radius of gear to another, by merely shifting the rack member 73 upwardly and downwardly. The member 80 is secured to the collar 78 by means of a knurled nut 81, and the collar itself is prevented from sliding along the arm 70 by a screw 82 passing through the collar and engaging the surface of the arm 70.

In order to prevent the rack from jumping the teeth of the gear with which it is in engagement, the member 80 may be provided with a horizontal portion 83 extending under any convenient horizontal member, as for instance, the tube 84. This horizontal portion 83 is made in the shape shown, i. e., tapering toward its free end, to throw the center of gravity of the entire rack assembly between the point of contact with the gear segment and the point of attachment under 81, to balance the weight between these two points, and thus avoid the development of unnecessary friction. As it is desired to utilize this instrument with different recording instruments, which vary with the make and model so far as the position of the actuating shaft is concerned, the shaft 72 is mounted so that it may be adjusted longitudinally in the casing. The shaft 72 is mounted in a tube 84 which is in turn mounted for sliding movement in the casing, as shown in Figure 8. The tube 84 has its upper portion cut away to allow movement of the gear segments 74 and 77, and carries on each end a bearing 85 and 86. The bearings hold a cylindrical portion of the shaft 72. The tube 84 is supported on a pillow block 87, which has a half bushing 88 to engage the upper surfaces of the cut away tube 84, as clearly shown in Figure 9. This half bushing is forced downwardly to hold the tube 84 in place by a screw 89 passing through the pillow block 87 and engaging the surface of the bushing 88. The portion of the tube 84 passing through the walls of the instrument also engages a similar bushing 90, and is thus held from rotation or displacement.

In order to prevent oscillation or vibration of the pen, a dash pot 91 may be operatively connected to the shaft 72, as shown in Figures 4 and 7. This dash pot is of the usual liquid or air filled form involving a plunger working in a cylinder. It is connected to the shaft 72 by means of an arm 92, so that rotation of the shaft reciprocates the plunger within the cylinder.

The above completes the description of the operative portions of this invention which are normally employed during operation. For installation, and when putting the device in service, and also for finding the point of zero differential, it is convenient to have some sort of a by-pass between the interior and exterior of the bellows which may be manually controlled. Instead of placing the by-pass in the pipe, it has been placed in one of the passages 26 (Figure 3) in such a position that it passes through the wall of the casing 17. It can be seen that with the valve in a position shown in Figure 3, communication is established between the passage 26 and the interior of the casing, which will, of course, equalize the pressures within and without the bellows. Any form of valve may be used, the form shown being merely a needle 94 seating in an aperture 95 through the wall of the casing 17 between the passage 26 and the interior of the casing.

The assembly and operation of the device should now be clear. The particular torque tube assembly desired is inserted in the device through the opening in the wall 52 of the casing 17, the ears 59 of the tube 55 entering the slots 60 of member 36. Bushing 61 is then threaded into the wall 52. The top of bushing 62 is grasped by the squared portion 62a, and the top of the torque tube twisted to tension the bellows and clamped by tightening nut 65. The arm 70 is then mounted on the end of rod 57, and the device calibrated. After the range of pressures to which the device is to respond is determined, the gear segment assembly is moved along shaft 72, and the rack moved along the arm 70 to the proper position. The position is so selected that the maximum pressure which it is contemplated to measure, as indicated by the particular chart employed, will turn the rod 57 through such an angle that the multiplication of this angular displacement by the calibration mechanism will cause the pen to travel to the correct position on the chart. After this has been done, it remains to set the members 45 and 46, in such positions that the valve 40 will unseat when the member 36 turns to bring the pen to either end of the chart employed. If it is decided to substitute a chart of the same diameter, but to record higher pressure differentials, it is merely necessary to move the gear and rack to the right (in Figure 4), and reset member 46 so that the valve opens at the new high differential.

It can be seen that with the device assembled as above described, and connected to lines 13 and 14, a differential existing between lines 13 and 14 will compress the bellows 20 and 21, turning member 36 against the torque of tube 56, thus turning the rod 57. The motion of rod 57 operates the multiplying device to actuate a pen P on a chart C.

I claim:

1. A force measuring device including a plurality of pressure responsive means adapted to produce equal forces when subjected to equal pressures, means subjecting said pressure responsive means to equal pressures simultaneously, a rotatable member having arcuate surfaces curved about the axis of said member, means offering elastic resistance to rotation of said member, and flexible means connecting each of said pressure responsive means to said rotatable member for creating torque therein, said torques being in assisting relation with respect to each other, said flexible means tangentially engaging respectively said arcuate surfaces to wind simultaneously thereon during rotation of said member in one direction and to unwind simultaneously during rotation in the opposite direction.

2. A force measuring device including a plurality of pressure responsive means adapted to produce equal forces when subjected to equal pressures, means subjecting said pressure responsive means to equal pressures simultaneously, a rotatable member having arcuate surfaces curved about the axis of said member, an elongated member adapted to undergo torsional deformation and having one end secured against movement, means connecting the other end of said elongated member to said rotatable member, and flexible means connecting each of said pressure responsive means to said rotatable member for creating torque therein, said torques being in assisting relation with respect to each other, said flexible means tangentially engaging respectively said arcuate surfaces to wind simultaneously thereon during rotation of said member in one direction and to unwind simultaneously during rotation in the opposite direction.

3. A device for evaluating forces within a closed casing including, a plurality of pressure responsive means within the casing adapted to produce equal forces when subjected to equal pressures, means subjecting said pressure responsive means to equal pressures simultaneously, a rotatable member having arcuate surfaces curved about the axis of said member, a tube adapted to undergo torsional deformation secured at one end to a wall of the casing and having its other end closed, means connecting the free end of said tube to said rotatable member, flexible means connecting each of said pressure responsive means to said rotatable member for creating torque therein, said torques being in assisting relation with respect to each other, said flexible means tangentially engaging respectively said arcuate surfaces to wind simultaneously thereon during rotation of said member in one direction and to unwind simultaneously during rotation in the opposite direction, and motion indicating means operatively connected to the free end of the tube and extending through said tube to the exterior of the casing.

4. A differential pressure indicating and recording device including a closed casing, means forming a plurality of closed chambers within the casing having portions movable in response to pressure differentials between the interior and exterior of said chambers, means forming communication between the interiors of said chambers, a rotatable member within the casing having arcuate surfaces curved about the axis of said member, flexible means connecting the movable portions of said chambers to said rotatable member for creating torque therein, said torques being in assisting relation with respect to each other, said flexible means tangeneially engaging respectively said arcuate surfaces to wind simultaneously thereon during rotation of said member in one direction and to unwind simultaneously during rotation in the opposite direction, a torsion tube within the casing secured at one end to a wall of the casing and having its other end closed, means operatively connecting said rotatable member to the free end of said tube, and motion indicating means operatively connected to the free end of the tube and extending through said tube to the exterior of the casing.

5. In a pressure differential recorder involving an elastic bellows, means, comprising a torsionally deformed tube, anchored at one end and secured to the bellows at its opposite end, stressing the bellows to cause deformation thereof to a position in one direction from the normal neutral position of the bellows under zero presuure differential between the interior and exterior of the bellows, and recording means actuated by movement of the bellows through a range between said deformed position and that elastic limit of the bellows which is in the same direction from the normal neutral position as said deformed position.

6. In a differential pressure recorder involving a bellows, a tube capable of torsional deformation, means connecting said bellows to one end of said tube to cause torsional deformation of the tube upon imposition of a pressure differential between the interior and exterior of the bellows, means supporting said other end of the tube for rotational adjustment, and means for holding said other end of the tube after rotational adjustment to establish an initial torsional deformation and a stress on the bellows when no pressure differential exists between the interior and exterior of said bellows.

7. In a differential pressure recorder involving a bellows, a tube capable of torsional deformation, means connecting said bellows to one end of said tube to cause rotation of said tube end in one direction upon imposition of an increased pressure differential between the interior and exterior of the bellows, and means mounting the other end of said tube for rotational adjustment in the opposite direction to cause an initial stressing of the bellows element, and means for holding said other end of the tube after such rotational adjustment.

8. A differential pressure recorder including a plurality of bellows supported within a casing, a rotatable element, a flexible ribbon means connecting a movable portion of each of said bellows to said rotatable element to rotate said element in the same direction upon change of pressure within said bellows, a torsion responsive assembly comprising a tube capable of torsional deformation and closed at one end, a rigid tube exterior of said deformable tube, a rod interior of said deformable tube, and means securing one end of said rigid tube and said rod to the closed end of said deformable tube, means on the other end of said deformable tube removably securing it to a wall of the casing, and means on the free end of the exterior tube engageable with said rotatable element for rotation thereby.

9. A differential pressure recorder involving a bellows, a rotatable member, yielding elastic means opposing rotation of said rotatable member away from a datum position, connecting means between said bellows and said member rotating said member upon imposition of a pressure differential between the interior and exterior of said bellows, means forming a passage between the interior and exterior of said bellows, valve means normally closing said passage, and means actuated by said rotatable member to unseat said valve to open said passage upon rotation of said member to a predetermined position.

10. A differential pressure recorder involving a bellows, a rotatable member, yielding elastic means opposing rotation of said member away from a datum position, connecting means between said bellows and said member rotating said member upon imposition of a pressure differential between the interior and exterior of said bellows, means forming a passage between the interior and exterior of said bellows, valve means normally closing said passage, and means actuated by said rotatable member to unseat said valve means to open said passage upon rotation of said member to either end of a predetermined range of movement.

11. A differential pressure recorder involving a bellows, a rotatable member, yielding elastic means opposing rotation of said member away from a datum position, connecting means between said bellows and said member rotating said member upon imposition of a pressure differential between the interior and exterior of said bellows, means forming a passage between the interior and exterior of said bellows, a valve member yieldingly held in the mouth of said passage and having a projecting portion, and elements adjustably secured to said rotatable member and engageable with the projecting portion to unseat said valve member upon rotation of said member to either end of a predetermined range of movement.

12. A differential pressure recorder involving a bellows, yielding elastic means opposing movement of said bellows, pressure recording means actuated by movement of said bellows, means forming a passage between the interior and exterior of said bellows, a valve in said passage, and means operated by movement of said bellows opening said valve when said recording means covers a predetermined range of movement.

13. In a pressure differential recording instrument, means forming a pair of chambers, including a movable element responsive to the pressure differential between said chambers, means transmitting the motion of said element to a recording stylus, said motion transmitting means being adjustable to vary the linear movement of the recording stylus for a given movement of said element, a means forming a valved passage between said chambers, means for opening said valve actuated by the motion of said element, said last mentioned means being adjustable whereby said valve opens at each end of a predetermined range of movement of said stylus to thereby permit equalization of the pressure in each chamber.

14. A pressure differential recording instrument including a bellows movable in response to variations in the pressure differentials between its interior and exterior, a rotatable member, means connecting said rotatable member to said bellows for rotation thereby, a stylus for recording the pressure differential being measured, adjustable actuating means connecting said stylus to said rotatable member and permitting adjustment of the relation between the linear movement of the stylus and the rotation of the rotatable element, means forming a passage between the interior and exterior of the bellows, a valve in said passage, and adjustable means for operating said valve in response to predetermined movement of said bellows to equalize the pressures on the interior and exterior of said bellows.

15. A measuring instrument including a member rotatable through an angle proportional to the quantity being measured, an arm secured to said member for rotation thereby, a shaft extending transversely with respect to said member, a rack adjustably mounted on said arm for adjustment toward or away from said member, and a gear adjustably mounted on said shaft operatively engaging said rack converting linear movement of the selected point of attachment of said rack on said arm into rotation of said shaft, the adjusted position of the rack on the arm serving to determine the relative movements of the member and the shaft.

16. A force and motion transmission device including a member having a portion thereof fixed against rotation, said member being capable of torsional deformation upon the application of a torque thereto, a plurality of pressure responsive means adapted to exert equal forces when subjected to equal pressures, operatively connected to said member in a region spaced from said fixed portion and in assisting torque creating relation thereto, and means for simultaneously subjecting said pressure responsive means to equal pressures, said pressure responsive means being so arranged that the resultant forces tending to deflect the member otherwise than about said axis are substantially neutralized, the radii from the axis of torsional deformation normal to said forces being equal in length and equiangularly disposed about said axis.

17. A force and motion transmission device including a member having a portion thereof fixed against rotation, said member being capable of torsional deformation upon the application of a torque thereto, a plurality of pressure responsive means adapted to exert equal forces when subjected to equal pressures, operatively connected to said member in a region spaced from said fixed portion and in assisting torque creating relation thereto, and means for simultaneously subjecting said pressure responsive means to equal pressures, the radii from the axis of torsional deformation normal to said forces being equal in length and equiangularly disposed about said axis, and meeting at substantially the same point on said axis whereby resultant forces tending to deflect the member otherwise than about said axis are substantially neutralized.

18. A measuring instrument including a member rotatable through an angle proportional to the quantity being measured, an arm secured to said member for rotation thereby, a shaft, the relative locations of the member and said shaft being fixed, a rack adjustably mounted on said arm for adjustment toward and away from said member, and a gear adjustably mounted on said shaft operatively engaging said rack converting linear movement of the selected point of attachment of said rack on said arm into rotation of said shaft, the adjusted position of the rack on the arm serving to determine the relative movements of the member and the shaft.

19. A measuring instrument including a member rotatable through an angle proportional to the quantity being measured, an arm secured to said member for rotation thereby, a shaft, the axis of said shaft being substantially perpendicular to a plane passing through the axis of said member, a rack adjustably mounted on said arm for adjustment toward and away from said member, and a gear adjustably mounted on said shaft operatively engaging said rack converting linear movement of the selected point of attachment of said rack on said arm into rotation of said shaft, the adjusted position of the rack on the arm serving to determine the relative movements of the member and the shaft.

20. A measuring instrument including a member rotatable through an angle proportional to the quantity being measured, an arm secured to said member for rotation thereby, a shaft extending transversely with respect to said member, a rack adjustably mounted on said arm for adjustment toward and away from said member, and a plurality of gears adjustably mounted on said shaft, said gears having different radii, any one gear being optionally adapted for operatively engaging said rack and converting linear movement of the selected point of attachment of said rack on said arm into rotation of said shaft, the relative movements of the member and the shaft being a function of the adjusted position of the rack on the arm and the radius of the chosen gear.

21. A force and motion transmitting device including an elongated member having a portion fixed against rotation, said member being capable of torsional deformation about an axis upon application of torque thereto at a region spaced from said fixed portion, a plurality of pressure responsive means arranged to exert equal forces upon application of equal pressures thereto, and angularly spaced about said member to exert said forces in a common plane normal to the axis of said member at a region spaced from said fixed portion, means for simultaneously exerting equal pressures on said pressure responsive means, and means operatively connecting said pressure responsive means to said element in assisting torque exerting relation to exert torque on said member, the radii from the axis of said member normal to said forces respectively being equal in length and equiangularly disposed about said axis in said plane, whereby forces tending to deflect the member otherwise than about the axis are substantially neutralized.

22. In a device for transmitting motion, a wall, a torsion tube having one end closed and the other end fixed to said wall, a plurality of means arranged to exert equal forces and angularly spaced about said torsion tube to exert said forces in a common plane, normal to the axis of said tube at a region spaced from the fixed end of said tube, means operatively connecting said force producing means to said tube in assisting torque exerting relation to exert torque on said tube, the radii from the axis of said tube normal to said forces respectively being equal in length and equiangularly disposed about said axis in said plane, whereby forces tending to deflect said tube otherwise than about its axis are substantially neutralized, and means on the opposite side of said wall from said pressure responsive means operatively connected to the closed end of the torsion tube and utilizing the movement thereof upon torsional deformation of the tube.

23. In a device for transmitting motion, a wall, a torsion tube capable of torsional deformation having one end closed and the other end fixed to said wall, a pair of members capable of resisting torsional deformation, one of said members being a tube exterior of said torsion tube, the other member being a rod within the torsion tube, means connecting said members to the closed end of said torsion tube, a plurality of means arranged to exert equal forces and angularly spaced about said torsion tube to exert said forces in a common plane normal to the axis of said tube at a region spaced from the fixed end of said tube, means operatively connecting said force producing means to said tube in assisting torque exerting relation to exert torque on said tube, the radii from the axis of said tube normal to said forces respectively being equal in length and equiangularly disposed about said axis in said plane, whereby forces tending to deflect said tube otherwise than about its axis are substantially neutralized, and means on the opposite side of the wall from said pressure responsive means for utilizing the resultant movement of said rod.

JOHN B. McGAY.